(12) United States Patent
Miyata et al.

(10) Patent No.: US 11,908,334 B2
(45) Date of Patent: Feb. 20, 2024

(54) INFORMATION PROCESSING APPARATUS, METHOD, AND NON-TRANSITORY COMPUTER READABLE MEDIUM FOR UAV PACKAGE DELIVERY TO A PARKING SPACE

(71) Applicant: TOYOTA JIDOSHA KABUSHIKI KAISHA, Toyota (JP)

(72) Inventors: Ai Miyata, Okazaki (JP); Yurika Tanaka, Yokosuka (JP); Hideo Hasegawa, Nagoya (JP); Hiroyuki Suzuki, Miyoshi (JP); Katsuhiro Ohara, Nagoya (JP); Tomoya Makino, Kariya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 106 days.

(21) Appl. No.: 17/487,536

(22) Filed: Sep. 28, 2021

(65) Prior Publication Data
US 2022/0101737 A1   Mar. 31, 2022

(30) Foreign Application Priority Data
Sep. 30, 2020   (JP) ................. 2020-166379

(51) Int. Cl.
  *G08G 5/02*   (2006.01)
  *B64C 39/02*   (2023.01)
  (Continued)

(52) U.S. Cl.
  CPC ............. *G08G 5/02* (2013.01); *B64C 39/024* (2013.01); *G05D 1/101* (2013.01); *G06Q 20/085* (2013.01);
  (Continued)

(58) Field of Classification Search
  CPC ........ G08G 5/02; B64C 39/024; G05D 1/101; G06Q 20/085; B64U 2101/60; B64U 2201/00
  See application file for complete search history.

(56) References Cited

U.S. PATENT DOCUMENTS

2017/0032315 A1* 2/2017 Gupta ................. H04L 67/52
2017/0090484 A1* 3/2017 Obaidi ................ B64C 39/024
2020/0327468 A1* 10/2020 Saran ............... G06Q 10/06312

FOREIGN PATENT DOCUMENTS

JP   2018-097444 A      6/2018
JP   2018097444 A   *  6/2018
(Continued)

*Primary Examiner* — Curtis A Kuntz
*Assistant Examiner* — James E Munion
(74) *Attorney, Agent, or Firm* — Oblon, McClelland, Maier & Neustadt, L.L.P.

(57) ABSTRACT

An information processing apparatus includes a controller configured to notify a package sender or a package recipient of information on one or more parking spaces at which an unmanned aircraft can land and from which the unmanned aircraft can take off, among a plurality of parking spaces for automobiles, reserve one parking space of the one or more parking spaces designated by the package sender or the package recipient as a take-off and landing location for the unmanned aircraft, and determine an operation plan for the unmanned aircraft so that the unmanned aircraft picks up or delivers a package at the take-off and landing location.

20 Claims, 6 Drawing Sheets

(51) Int. Cl.
    *G05D 1/10* (2006.01)
    *G06Q 20/08* (2012.01)
    *B64U 10/60* (2023.01)
    *G05D 1/00* (2006.01)
    *B64U 101/60* (2023.01)
(52) U.S. Cl.
    CPC ...... *B64U 2101/60* (2023.01); *B64U 2201/00* (2023.01)

(56) References Cited

FOREIGN PATENT DOCUMENTS

| | | | |
|---|---|---|---|
| JP | 6807129 B1 * | 1/2021 | |
| WO | WO 2020/121530 A1 | 6/2020 | |
| WO | WO-2020121530 A1 * | 6/2020 | ........... B64C 39/024 |

\* cited by examiner

INFORMATION PROCESSING APPARATUS, METHOD, AND NON-TRANSITORY COMPUTER READABLE MEDIUM FOR UAV PACKAGE DELIVERY TO A PARKING SPACE

CROSS-REFERENCE TO RELATED APPLICATION

This application claims priority to Japanese Patent Application No. 2020-166379, filed on Sep. 30, 2020, the entire contents of which are incorporated herein by reference.

TECHNICAL FIELD

The present disclosure relates to an information processing apparatus, a method, and a medium.

BACKGROUND

Technology for transporting packages using unmanned aircraft such as drones is known. For example, Patent Literature (PTL) 1 discloses a package delivery system that uses a parking space attached to a package recipient's home or place of work as a reception point, and controls a flying object holding a package to arrive at the reception point.

CITATION LIST

Patent Literature

PTL 1: JP 2018-097444 A

SUMMARY

A non-proprietary parking space, such as a metered parking space, for example, may be used as a location for delivery of packages by an unmanned aircraft. However, the unmanned aircraft cannot always land at the non-proprietary parking space depending on parking conditions. Therefore, there is room for improvement with respect to technology for landing unmanned aircraft at parking spaces for automobiles to deliver packages.

It would be helpful to improve technology for landing unmanned aircraft at parking spaces for automobiles to deliver packages.

An information processing apparatus according to an embodiment of the present disclosure includes a controller configured to:
  notify a package sender or a package recipient of information on one or more parking spaces at which an unmanned aircraft can land and from which the unmanned aircraft can take off, among a plurality of parking spaces for automobiles;
  reserve one parking space of the one or more parking spaces designated by the package sender or the package recipient as a take-off and landing location for the unmanned aircraft; and
  determine an operation plan for the unmanned aircraft so that the unmanned aircraft picks up or delivers a package at the take-off and landing location.

A method according to an embodiment of the present disclosure is a method performed by an information processing apparatus, the method including:
  notifying a package sender or a package recipient of information on one or more parking spaces at which an unmanned aircraft can land and from which the unmanned aircraft can take off, among a plurality of parking spaces for automobiles;
  reserving one parking space of the one or more parking spaces designated by the package sender or the package recipient as a take-off and landing location for the unmanned aircraft; and
  determining an operation plan for the unmanned aircraft so that the unmanned aircraft picks up or delivers a package at the take-off and landing location.

A non-transitory computer readable medium according to an embodiment of the present disclosure stores a program configured to cause an information processing apparatus to execute operations, the operations including:
  notifying a package sender or a package recipient of information on one or more parking spaces at which an unmanned aircraft can land and from which the unmanned aircraft can take off, among a plurality of parking spaces for automobiles;
  reserving one parking space of the one or more parking spaces designated by the package sender or the package recipient as a take-off and landing location for the unmanned aircraft; and
  determining an operation plan for the unmanned aircraft so that the unmanned aircraft picks up or delivers a package at the take-off and landing location.

According to an embodiment of the present disclosure, technology for landing unmanned aircraft at parking spaces for automobiles to deliver packages is improved.

DETAILED DESCRIPTION

Hereinafter, an embodiment of the present disclosure will be described.

Summary of Embodiment

Figure 1:
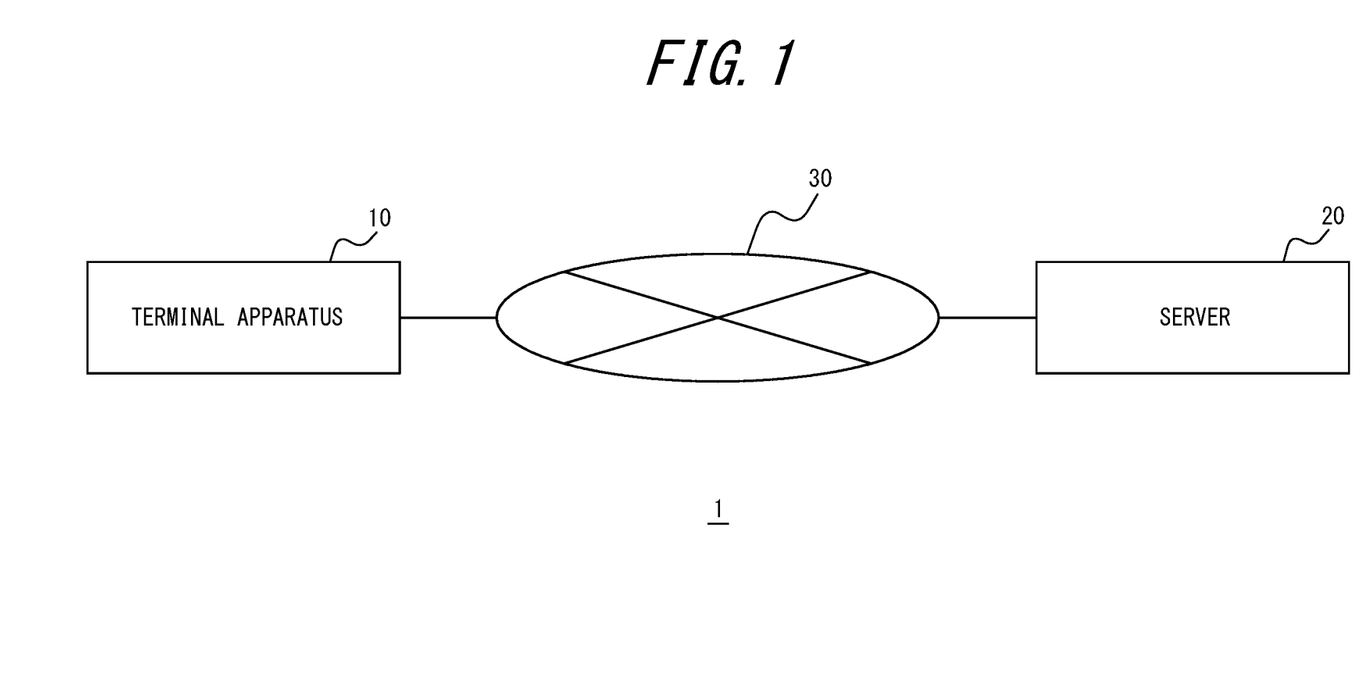
FIG. 1 is a block diagram illustrating a schematic configuration of a system according to an embodiment of the present disclosure.

An outline of a system 1 according to an embodiment of the present disclosure will be described with reference to FIG. 1. The system 1 includes a terminal apparatus 10 and a server 20. The terminal apparatus 10 and the server 20 can communicate with each other via a network 30 such as a mobile communication network or the Internet, for example.

The terminal apparatus 10 is any information processing apparatus that a user can use. For example, a general purpose apparatus such as a smartphone in the possession of the user or a personal computer (PC) may be used as the terminal apparatus 10.

The server 20 includes a single information processing apparatus or multiple information processing apparatuses that can communicate with each other. The server 20 is used to provide two types of service including, for example, parking space reservation service for automobiles and logistics service in which packages are delivered using unmanned aircraft such as drones. The user can use the parking space reservation service to reserve a parking space to park an automobile. The user can also use the logistics service to receive or deposit a package from or at an unmanned aircraft at a parking space.

The package to be delivered in the logistics service may be, for example, a product ordered by the user in online shopping or the like, or an item to be delivered between users. In a case in which the package to be delivered is an ordered product, the package sender may be the seller of the product and the package recipient may be the purchaser of the product.

In the present embodiment, an unmanned aircraft picks up a package at a designated point and transports the package to a delivery center, or a delivery base for transport vehicles or the like, in response to a request from a package sender. The unmanned aircraft also transports a package from a delivery base and delivers the package at a designated point, in response to a request from a package recipient. However, an embodiment in which a package is delivered directly from a package sender to a package recipient by an unmanned aircraft without going through any delivery base can be implemented.

First, an outline of the present embodiment will be described, and details thereof will be described later. The server 20 notifies a package sender or a package recipient of one or more parking spaces at which an unmanned aircraft can land and from which the unmanned aircraft can take off, among a plurality of parking spaces for automobiles. The server 20 reserves one parking space designated by the package sender or the package recipient as a take-off and landing location for the unmanned aircraft. The server 20 then determines an operation plan for the unmanned aircraft so that the unmanned aircraft picks up or delivers the package at the take-off and landing location.

Thus, according to the present embodiment, the package sender or the package recipient can reserve the parking space at which the unmanned aircraft can land and from which the unmanned aircraft can take off, among the plurality of parking spaces for automobiles, to deposit or receive a package at or from the unmanned aircraft at the parking space. This reduces the probability of occurrence of an inconvenience such as a mistaken reservation for a parking space at which the unmanned aircraft cannot land or from which the unmanned aircraft cannot take off, or prevention of landing of the unmanned aircraft caused by a stranger's automobile parked in the parking space at which the package is to be picked up or delivered. Accordingly, technology for landing unmanned aircraft at parking spaces for automobiles to deliver packages is improved in that the reliability of delivery of the packages between the package senders or the package recipients and the unmanned aircraft is increased.

Next, configurations of the system 1 will be described in detail.

(Configuration of Terminal Apparatus)

Figure 2:
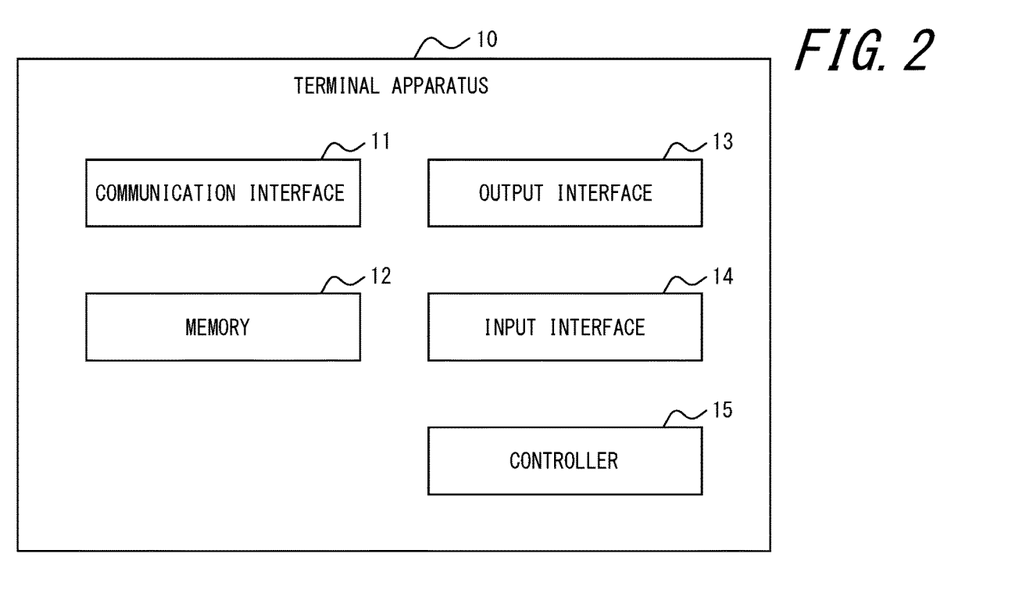
FIG. 2 is a block diagram illustrating a schematic configuration of a terminal apparatus.

As illustrated in FIG. 2, the terminal apparatus 10 includes a communication interface 11, a memory 12, an output interface 13, an input interface 14, and a controller 15.

The communication interface 11 may include at least one communication interface for connecting to the network 30. The communication interface is compliant with mobile communication standards such as the 4th generation (4G) standard and the 5th generation (5G) standard, a wired local area network (LAN) standard, or a wireless LAN standard, for example, but not limited to these, and may be compliant with any communication standard. In the present embodiment, the terminal apparatus 10 is connected to the network 30 via the communication interface 11.

The memory 12 includes one or more memories. The memories are semiconductor memories, magnetic memories, optical memories, or the like, for example, but are not limited to these. The memories included in the memory 12 may each function as, for example, a main memory, an auxiliary memory, or a cache memory. The memory 12 stores any information used for operations of the terminal apparatus 10. For example, the memory 12 may store a system program, an application program, embedded software, and the like. The information stored in the memory 12 may be updated with, for example, information acquired from the network 30 via the communication interface 11.

The output interface 13 includes at least one output device for outputting information to notify the user of the information. The output device is a display for outputting information as video, a speaker for outputting information as audio, or the like, for example, but is not limited to these.

The input interface 14 includes at least one input device for detecting user input. The input device is a physical key, a capacitive key, a touch screen integrally provided with a display of the output interface 13, a microphone for accepting audio input, a camera, or the like, for example, but is not limited to these.

The controller 15 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 15 controls the operations of the entire terminal apparatus 10. Details of the operations of the terminal apparatus 10 controlled by the controller 15 will be described later.

(Configuration of Server)

Figure 3:
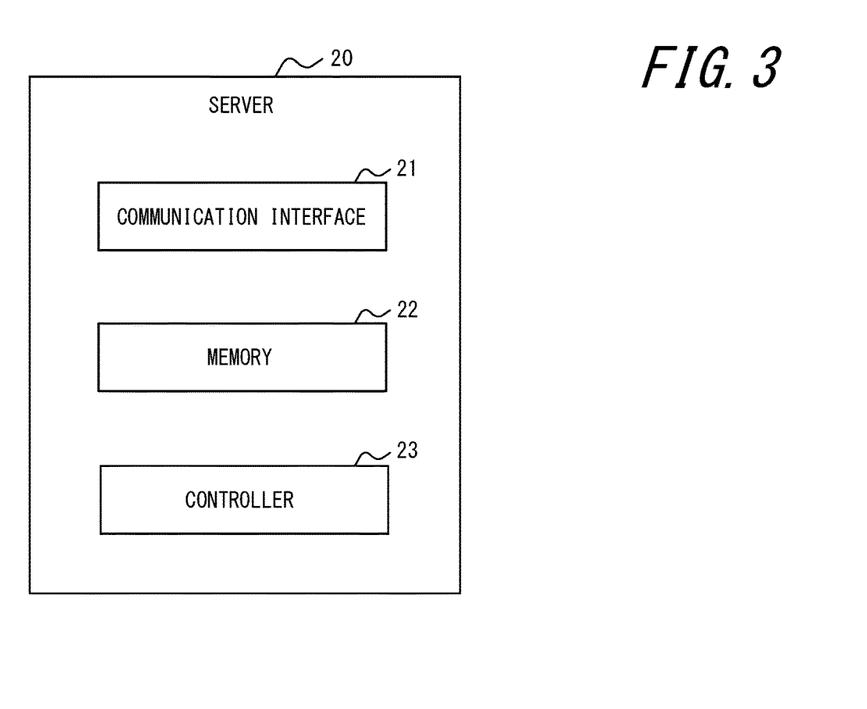
FIG. 3 is a block diagram illustrating a schematic configuration of a server.

As illustrated in FIG. 3, the server 20 includes a communication interface 21, a memory 22, and a controller 23.

The communication interface 21 includes at least one communication interface for connecting to the network 30. The communication interface may be compliant with a wired LAN standard or a wireless LAN standard, for example. In the present embodiment, the server 20 is connected to the network 30 via the communication interface 21.

The memory 22 includes one or more memories. The memories included in the memory 22 may each function as, for example, a main memory, an auxiliary memory, or a cache memory. The memory 22 stores any information used for operations of the server 20. For example, the memory 22 may store a system program, an application program, a database, map information, and the like. The information stored in the memory 22 may be updated with, for example, information acquired from the network 30 via the communication interface 21.

In the present embodiment, the memory 22 stores a user database, a parking space database, and an unmanned aircraft database.

Figure 4:
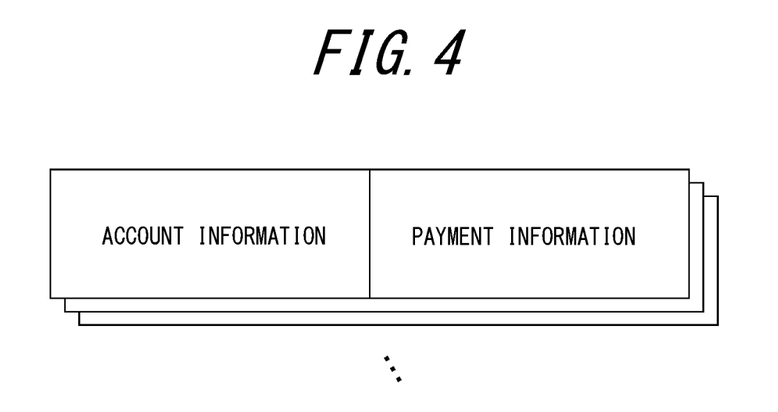
FIG. 4 is a diagram illustrating an example of a user database.

As illustrated in FIG. 4, the user database includes user data having "account information" and "payment information" for each user.

"Account information" includes any information regarding a user. For example, the account information may include a login ID and a password for logging into service, a user ID, a username, and the like, but is not limited to these. The account information may also be used to authenticate a package sender or a package recipient, when, for example, an unmanned aircraft picks up or delivers a package.

"Payment information" includes any information to be used to make electronic payment. For example, the payment information may include a user's bank account information, credit card information, or the like, but is not limited to these.

Figure 5:
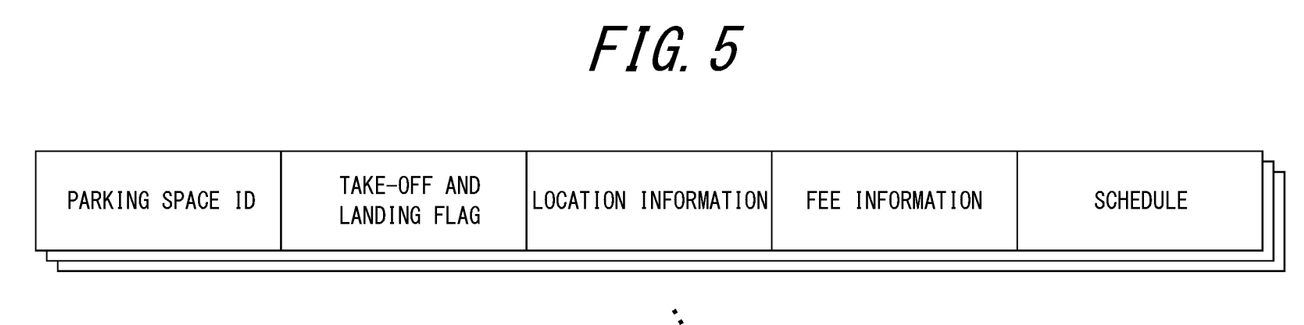
FIG. 5 is a diagram illustrating an example of a parking space database.

As illustrated in FIG. 5, the parking space database includes parking space data having a "parking space ID", a "take-off and landing flag", "location information", "fee information", and a "schedule" for each parking space.

A "parking space ID" is information uniquely identifying a parking space. In the present embodiment, the parking space includes, for example, a single automobile parking space. The administrator of each parking space registered in the parking space database may be, for example, an entity that provides hourly parking spaces such as metered parking spaces, or may be an individual.

A "take-off and landing flag" is information indicating whether an unmanned aircraft can take off from and land at a parking space. The take-off and landing flag may be registered based on user input or automatically, for example, when the parking space is registered in the parking space database. For example, a flag indicating that the unmanned aircraft can take off and land may be registered for a parking space located outdoors. On the other hand, a flag indicating that the unmanned aircraft cannot take off or land may be registered for a parking space located indoors. However, the setting of the take-off and landing flag is not limited to these, and any method can be employed.

"Location information" is information indicating the location of a parking space on a map.

"Fee information" is information indicating a usage fee for a parking space. For example, a usage fee per predetermined unit of time may be registered as the fee information.

A "schedule" is information indicating a schedule of reservation statuses of a parking space. For example, information indicating reservable time periods and non-reservable time periods may be registered as the schedule. The schedule may be determined/updated each time a reservation for use of the parking space is accepted.

Figure 6:
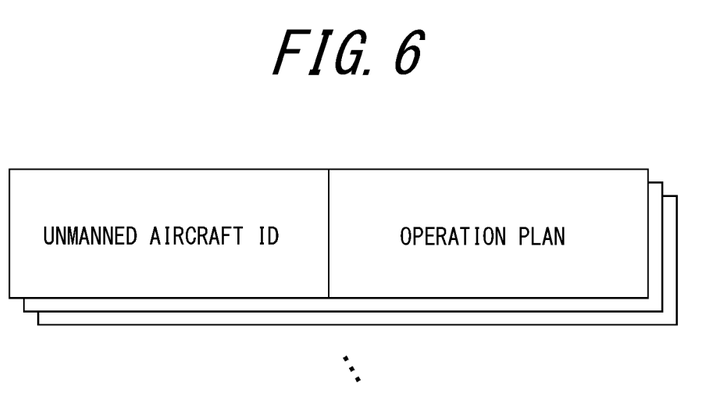
FIG. 6 is a diagram illustrating an example of an unmanned aircraft database.

As illustrated in FIG. 6, the unmanned aircraft database includes unmanned aircraft data having an "unmanned aircraft ID" and an "operation plan" for each unmanned aircraft.

An "unmanned aircraft ID" is information uniquely identifying an unmanned aircraft.

An "operation plan" is information regarding an operation plan for an unmanned aircraft to deliver a package. For example, the operation plan may include a time period during which the unmanned aircraft is used for delivery of the package, a flight path during the time period, a location where the unmanned aircraft picks up or delivers the package, a user ID of a package sender or a package recipient, and the like. However, the information included in the operation plan is not limited to these examples. For example, the operation plan may include information on a time period during which the unmanned aircraft cannot be used for delivery of packages, such as a time period during which maintenance, recharging, or the like is performed, information on the location of the unmanned aircraft during a period when the unmanned aircraft is not used for delivery of packages, and the like.

The controller 23 illustrated in FIG. 3 includes at least one processor, at least one programmable circuit, at least one dedicated circuit, or a combination of these. The controller 23 controls the operations of the entire server 20. Details of the operations of the server 20 controlled by the controller 23 will be described later.

(Flow of Operations of System)

Figure 7:
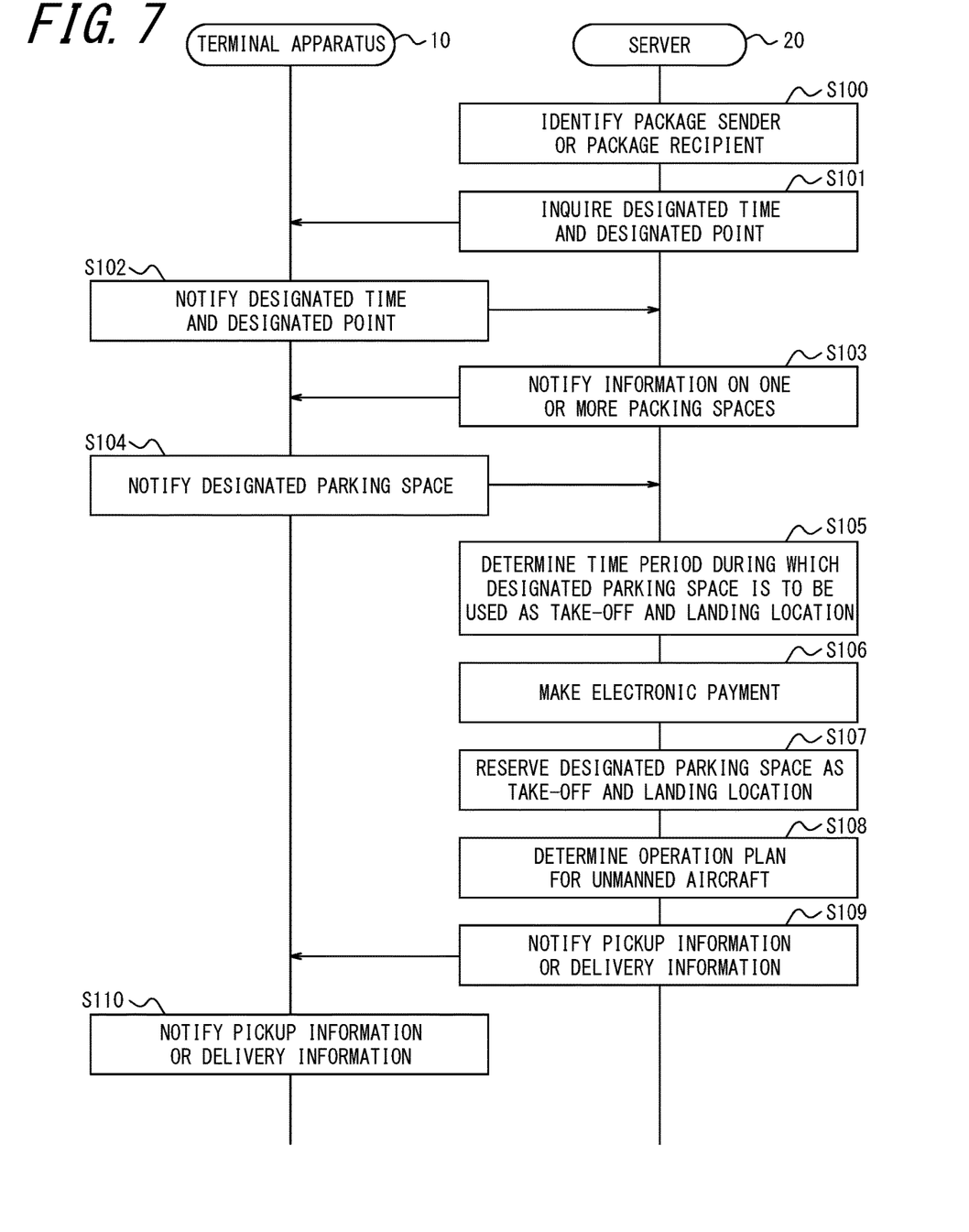
FIG. 7 is a flowchart illustrating operations of the system.

Operations of the terminal apparatus 10 and the server 20 of the system 1 will be described with reference to FIG. 7. Here, it is assumed that the user of the terminal apparatus 10 is a package sender or a package recipient.

Step S100: The controller 23 of the server 20 identifies the user who is a package sender or a package recipient.

Specifically, when the controller 23 receives a delivery request for a package from the terminal apparatus 10 via the communication interface 21, the controller 23 identifies the user who is a package sender or a package recipient by acquiring a user ID of the package sender or the package recipient from the delivery request. The delivery request for the package may be transmitted from the terminal apparatus 10 to the server 20 when the user, for example, desiring to receive or deposit the package from or at an unmanned aircraft, performs a predetermined operation on the terminal apparatus 10. The "predetermined operation" may include, for example, an operation to request that the package be received or deposited, an operation to select delivery by an unmanned aircraft as a delivery means for a product purchased through online shopping, or the like.

Step S101: The controller 23 inquires a designated time and a designated point of the user.

Specifically, the controller 23 notifies the user via the terminal apparatus 10 that a time and a point at which the user desires to receive or deposit the package need be designated.

Step S102: The controller 15 of the terminal apparatus 10 notifies the server 20 of a time and a point that are designated by the user, via the communication interface 11.

Step S103: The controller 23 of the server 20 notifies the user, via the terminal apparatus 10, of information on one or more parking spaces at which an unmanned aircraft can land and from which the unmanned aircraft can take off, among a plurality of parking spaces for automobiles.

Specifically, the controller 23 identifies, among a plurality of parking spaces registered in the parking space database, one or more parking spaces at which the unmanned aircraft can land and from which the unmanned aircraft can take off, with reference to take-off and landing flags. Alternatively, the controller 23 may identify, among a plurality of parking spaces registered in the parking space database, one or more parking spaces at which the unmanned aircraft can land and from which the unmanned aircraft can take off, which can be reserved during a predetermined time period that is determined based on the designated time (e.g., "15 minutes from the designated time"), and which is located within a predetermined distance from the designated point (e.g., "200 meters or less from the designated point"). The controller 23 notifies the user of location information and fee information for the one or more identified parking spaces by transmitting the information to the terminal apparatus 10 for outputting the information.

Step S104: The controller 15 of the terminal apparatus 10 notifies the server 20, via the communication interface 11, of one parking space designated by the user (hereinafter referred to as "designated parking space"), among the one or more parking spaces notified by the server 20.

Step S105: The controller 23 of the server 20 determines a time period during which the designated parking space is to be used as a take-off and landing location for the unmanned aircraft.

Specifically, the predetermined time period that is determined based on the designated time in step S103 is determined as the time period during which the designated parking space is to be used as a take-off and landing location for the unmanned aircraft.

Step S106: The controller 23 makes electronic payment of a usage fee for the designated parking space using payment information for the user.

The controller 23 may make electronic payment of a package delivery fee at least in part, in addition to the usage fee for the designated parking space.

Step S107: The controller 23 reserves the designated parking space as the take-off and landing location for the unmanned aircraft.

Specifically, the controller 23 updates the schedule of the designated parking space to accept a reservation for use of the designated parking space as the take-off and landing location for the unmanned aircraft during the time period determined in step S105 (hereinafter also referred to as "reserved time period").

Step S108: The controller 23 determines an operation plan for the unmanned aircraft so that the unmanned aircraft picks up or delivers the package at the designated parking space reserved as the take-off and landing location.

Specifically, the controller 23 identifies, with reference to the operation plan for each unmanned aircraft registered in the unmanned aircraft database, one unmanned aircraft that can pick up or deliver the package at the designated parking space reserved as the take-off and landing location during the reserved time period. The controller 23 then determines an operation plan for that unmanned aircraft so that the unmanned aircraft picks up or delivers the package at the designated parking space reserved as the take-off and landing location during the reserved time period. In an example, the unmanned aircraft may, according to the operation plan, land at the designated parking space at the start time of the reserved time period, pick up or deliver the package from or to the user, and then take off from the designated parking space by the end time of the reserved time period.

Step S109: The controller 23 notifies the user, via the terminal apparatus 10, of information (hereinafter also referred to as "pickup information") indicating that the unmanned aircraft is to pick up the package at the designated parking space reserved as the take-off and landing location, or information (hereinafter also referred to as "delivery information") indicating that the unmanned aircraft is to deliver the package thereat.

Specifically, in a case in which the user is a package sender, the controller 23 notifies the user of the pickup information by transmitting the pickup information to the terminal apparatus 10 for outputting the pickup information. The pickup information may include, for example, location information for the designated parking space, the reserved time period, information indicating a procedure by which the user deposits the package at the unmanned aircraft, and the like, but is not limited to these examples, and may include any information regarding the pickup of the package by the unmanned aircraft.

Alternatively, in a case in which the user is a package recipient, the controller 23 notifies the user of the delivery information by transmitting the delivery information to the terminal apparatus 10 for outputting the delivery information. The delivery information may include, for example, location information for the designated parking space, the reserved time period, information indicating a procedure by which the user takes out the package from the unmanned aircraft, and the like, but is not limited to these examples, and may include any information regarding the delivery of the package by the unmanned aircraft.

Step S110: The controller 15 of the terminal apparatus 10 notifies the user of the pickup or delivery information received from the server 20 via the communication interface 11. Specifically, the controller 15 notifies the user of the pickup or delivery information by outputting the pickup or delivery information via the output interface 13.

As described above, the server 20 according to the present embodiment notifies a package sender or a package recipient of one or more parking spaces at which an unmanned aircraft can land and from which the unmanned aircraft can take off, among a plurality of parking spaces for automobiles. The server 20 reserves one parking space designated by the package sender or the package recipient as a take-off and landing location for the unmanned aircraft. The server 20 then determines an operation plan for the unmanned aircraft so that the unmanned aircraft picks up or delivers the package at the take-off and landing location.

According to such a configuration, the package sender or the package recipient can reserve the parking space at which the unmanned aircraft can land and from which the unmanned aircraft can take off, among the plurality of parking spaces for automobiles, to deposit or receive a package at or from the unmanned aircraft at the parking space. This reduces the probability of occurrence of an inconvenience such as a mistaken reservation for a parking space at which the unmanned aircraft cannot land or from which the unmanned aircraft cannot take off, or prevention of landing of the unmanned aircraft caused by a stranger's automobile parked in the parking space at which the package is to be picked up or delivered. Accordingly, technology for landing unmanned aircraft at parking spaces for automobiles to deliver packages is improved in that the reliability of delivery of the packages between the package senders or the package recipients and the unmanned aircraft is increased.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which the terminal apparatus 10 executes some or all of the operations that are executed by the server 20 in the embodiment described above can be implemented.

An embodiment in which multiple information processing apparatuses that can communicate with each other perform distributed processing of some or all of the operations executed by the server 20 can be implemented. For example, a first information processing apparatus managed by a first entity that provides the parking space reservation service and a second information processing apparatus managed by a second entity that provides the logistics service in which packages are delivered using unmanned aircraft may cooperate to thereby perform operations similar to those of the server 20. In an example, the first information processing apparatus stores the parking database and manages information on a plurality of parking spaces for automobiles. The second information processing apparatus stores the user database and the unmanned aircraft database. The second information processing apparatus acquires, from the first information processing apparatus, information on one or more parking spaces at which an unmanned aircraft can land and from which the unmanned aircraft can take off, and notifies a package sender or a package recipient of the information via the terminal apparatus 10. The second information processing apparatus transmits, to the first information processing apparatus, a request to reserve a parking space designated by the package sender or the package recipient as a take-off and landing location for the unmanned aircraft. Then, the first information processing apparatus reserves the designated parking space in response to the request.

For example, an embodiment in which a general purpose information processing apparatus functions as the terminal apparatus 10 or the server 20 according to the embodiment described above can also be implemented. Specifically, a program in which processes for realizing the functions of the terminal apparatus 10 or the server 20 according to the above-described embodiment are written may be stored in a memory of the information processing apparatus, and the program may be read and executed by a processor of the information processing apparatus. Accordingly, the present disclosure can also be implemented as a program executable by a processor, or a non-transitory computer readable medium storing the program.

The invention claimed is:

1. An information processing apparatus comprising a memory configured to store a parking space database and a controller including at least one processor, programmable circuit, dedicated circuit, or a combination thereof, the controller being configured to:
    registering a first flag indicating that an unmanned aircraft can take off and land for each parking space located outdoors and a second flag indicating that an unmanned aircraft cannot take off or land for each parking space located indoors in the parking space database, among a plurality of parking spaces for automobiles;
    notify a package sender or a package recipient of information on one or more parking spaces for which the first flag is registered in the parking space database;
    reserve one parking space of the one or more parking spaces designated by the package sender or the package recipient as a take-off and landing location for the unmanned aircraft; and
    determine an operation plan for the unmanned aircraft so that the unmanned aircraft picks up or delivers a package at the take-off and landing location,
    wherein the controller is configured to make electronic payment of a usage fee for the one parking space using payment information for the package sender or the package recipient.

2. The information processing apparatus according to claim 1, wherein the controller is configured to notify the package sender or the package recipient of information on one or more parking spaces at which the unmanned aircraft lands and from which the unmanned aircraft takes off, the one or more parking spaces being located within a predetermined distance from a point designated by the package sender or the package recipient, among the plurality of parking spaces for automobiles.

3. The information processing apparatus according to claim 1, wherein the controller is configured to acquire the information on the one or more parking spaces at which the unmanned aircraft lands and from which the unmanned aircraft takes off, from an external apparatus configured to manage information on the plurality of parking spaces for automobiles.

4. The information processing apparatus according to claim 1, wherein the controller is configured to notify the package sender or the package recipient of information indicating that the unmanned aircraft picks up or delivers the package at the take-off and landing location.

5. The information processing apparatus according to claim 1, wherein the controller is configured to:
    determine a time period during which the one parking space is to be used as the take-off and landing location; and
    determine the operation plan for the unmanned aircraft so that the unmanned aircraft picks up or delivers the package at the take-off and landing location in the time period.

6. The information processing apparatus according to claim 5, wherein the controller is configured to determine the time period during which the one parking space is to be used as the take-off and landing location, based on a time designated by the package sender or the package recipient.

7. A method performed by an information processing apparatus, the method comprising:
    registering a first flag indicating that an unmanned aircraft can take off and land for each parking space located outdoors and a second flag indicating that an unmanned aircraft cannot take off or land for each parking space located indoors in a parking space database, among a plurality of parking spaces for automobiles;
    notifying a package sender or a package recipient of information on one or more parking spaces for which the first flag is registered in the parking space database;
    reserving one parking space of the one or more parking spaces designated by the package sender or the package recipient as a take-off and landing location for the unmanned aircraft;
    determining an operation plan for the unmanned aircraft so that the unmanned aircraft picks up or delivers a package at the take-off and landing location; and
    making electronic payment of a usage fee for the one parking space using payment information for the package sender or the package recipient.

8. The method according to claim 7, wherein the package sender or the package recipient is notified of information on one or more parking spaces at which the unmanned aircraft lands and from which the unmanned aircraft takes off, the one or more parking spaces being located within a predetermined distance from a point designated by the package sender or the package recipient, among the plurality of parking spaces for automobiles.

9. The method according to claim 7, further comprising acquiring the information on the one or more parking spaces at which the unmanned aircraft lands and from which the unmanned aircraft takes off, from an external apparatus configured to manage information on the plurality of parking spaces for automobiles.

10. The method according to claim 7, further comprising notifying the package sender or the package recipient of information indicating that the unmanned aircraft picks up or delivers the package at the take-off and landing location.

11. The method according to claim 7, further comprising determining a time period during which the one parking space is to be used as the take-off and landing location,
wherein the operation plan for the unmanned aircraft is determined so that the unmanned aircraft picks up or delivers the package at the take-off and landing location in the time period.

12. The method according to claim 11, wherein the time period during which the one parking space is to be used as the take-off and landing location is determined based on a time designated by the package sender or the package recipient.

13. A non-transitory computer readable medium storing a program configured to cause an information processing apparatus to execute operations, the operations comprising:
registering a first flag indicating that an unmanned aircraft can take off and land for each parking space located outdoors and a second flag indicating that an unmanned aircraft cannot take off or land for each parking space located indoors in a parking space database, among a plurality of parking spaces for automobiles;
notifying a package sender or a package recipient of information on one or more parking spaces for which the first flag is registered in the parking database;
reserving one parking space of the one or more parking spaces designated by the package sender or the package recipient as a take-off and landing location for the unmanned aircraft;
determining an operation plan for the unmanned aircraft so that the unmanned aircraft picks up or delivers a package at the take-off and landing location; and
making electronic payment of a usage fee for the one parking space using payment information for the package sender or the package recipient.

14. The medium according to claim 13, wherein the package sender or the package recipient is notified of infolination on one or more parking spaces at which the unmanned aircraft lands and from which the unmanned aircraft takes off, the one or more parking spaces being located within a predetermined distance from a point designated by the package sender or the package recipient, among the plurality of parking spaces for automobiles.

15. The medium according to claim 13, wherein the operations further comprise acquiring the information on the one or more parking spaces at which the unmanned aircraft lands and from which the unmanned aircraft takes off, from an external apparatus configured to manage information on the plurality of parking spaces for automobiles.

16. The medium according to claim 13, wherein the operations further comprise notifying the package sender or the package recipient of information indicating that the unmanned aircraft picks up or delivers the package at the take-off and landing location.

17. The medium according to claim 13, wherein
the operations further comprise determining a time period during which the one parking space is to be used as the take-off and landing location, and
the operation plan for the unmanned aircraft is determined so that the unmanned aircraft picks up or delivers the package at the take-off and landing location in the time period.

18. The information processing apparatus according to claim 1, wherein the controller is configured to:
determine a time period during which the one parking space is to be used as the take-off and landing location; and
update a schedule of the one parking space to accept a reservation for use of the one parking space as the take-off and landing location for the unmanned aircraft during the time period.

19. The method according to claim 7, further comprising:
determining a time period during which the one parking space is to be used as the take-off and landing location; and
updating a schedule of the one parking space to accept a reservation for use of the one parking space as the take-off and landing location for the unmanned aircraft during the time period.

20. The medium according to claim 13, wherein the operations further comprise:
determining a time period during which the one parking space is to be used as the take-off and landing location; and
updating a schedule of the one parking space to accept a reservation for use of the one parking space as the take-off and landing location for the unmanned aircraft during the time period.

* * * * *